United States Patent [19]

Arimoto et al.

[11] Patent Number: 4,929,044
[45] Date of Patent: May 29, 1990

[54] OPTICAL PICKUP USING WAVEGUIDE

[75] Inventors: Akira Arimoto, Kodaira, Japan; Sachiko Ishikawa, Braunschweig, Fed. Rep. of Germany; Keiji Kataoka, Kawagoe, Japan

[73] Assignee: Hitachi, Ltd., Tokyo, Japan

[21] Appl. No.: 193,594

[22] Filed: May 13, 1988

[30] Foreign Application Priority Data

| May 13, 1987 | [JP] | Japan | 62-114602 |
| Jul. 31, 1987 | [JP] | Japan | 62-190038 |
| Sep. 4, 1987 | [JP] | Japan | 62-220230 |

[51] Int. Cl.$^5$ .............................................. G02B 6/10
[52] U.S. Cl. ................................ 350/96.13; 350/96.14
[58] Field of Search ............... 350/96.13, 96.12, 96.14, 350/3.61, 3.8; 369/121

[56] References Cited

U.S. PATENT DOCUMENTS

| 4,738,501 | 4/1988 | Sunagawa et al. | 350/96.13 |
| 4,747,090 | 5/1988 | Yamashita et al. | 350/96.13 |

Primary Examiner—William L. Sikes
Assistant Examiner—Robert E. Wise
Attorney, Agent, or Firm—Fay, Sharpe, Beall, Fagan, Minnich & McKee

[57] ABSTRACT

An optical pickup comprises at least a semiconductor laser, a waveguide optically coupled with the semiconductor laser for propagating therein a light from the semiconductor to guide it to a recording medium and a light deflector element provided on the waveguide for deflecting the light propagated in the waveguide by means of a surface acoustic wave. A multi-mode oscillation laser capable of stably operating in longitudinal modes the number of which is not larger than 5 is used as the semiconductor laser. The semiconductor laser is disposed in proximity to the waveguide at a distance not larger than 1 $\mu$m, thereby inputting the light from the semiconductor laser into the waveguide with a high efficiency. A frequency applied to the light deflector element may be changed upon change between a readout state and a write-in state so that a light spot on the recording medium is held at a predetermined position (track or address). In the case where a grating is used as a light coupling element between the waveguide and the exterior thereof, a hologram grating is disposed in a path of the light derived through the light coupling grating from the waveguide to the exterior thereof so that a chromatic aberration produced at the light coupling grating due to a change in wavelength of the semiconductor laser is cancelled by that produced at the hologram grating.

30 Claims, 6 Drawing Sheets

| STATE | POWER | Δλ |
|---|---|---|
| READ-OUT | 3mW | 5nm |
| WRITE-IN | 30mW | |

OPTICAL PICKUP USING WAVEGUIDE

BACKGROUND OF THE INVENTION

The present invention relates to an optical pickup for writing or reading information in or from an optical information recording medium, and more particularly to an optical pickup which uses a waveguide having a substrate made of Ti-LiNbO$_3$, Si or the like and is suitable for fast accessing to an optical recording medium such as an optical disk, an optical card or the like.

The optical disks are widely used as compact disks for sound, video disks for image and memory disks for computers. To reduce the sizes of various apparatuses using the optical disks and to enable fast accessing to the optical disk, it is an indispensable requirement to reduce the size of an optical pickup for retrieving information from the optical disk and to remove a mechanical light deflector for attainment of fast accessing. However, any further reduction of the size of a lens and the further size reduction and speed-up of an optical light deflector driven by an electromagnetic coil are difficult. In order to solve this problem, studies of integration of optical elements on a single crystal plate in a thin film form have been conducted. According to Optoelectronics Conference '86 Technical Digest, pp. 64-65 (sponsored by The Institute of Electronics and Communication Engineers of Japan on 1986), a lens, a light detector and a grating for detecting auto-focus and tracking control signals are integrated on an Si crystal plate and a laser is disposed in proximity and stuck on to the Si crystal plate with a distance of 25 $\mu$m maintained therebetween. Further, there is a try to integrate the laser itself on a waveguide substrate. However, this try has not yet been realized since there is a technique of matching Si or Ti-LiNbO$_3$ with the waveguide substrate.

An optical pickup using a waveguide has been proposed by, for example, U.S. Ser. No. 842,200 filed on Mar. 21, 1986 and U.S. Ser. No. 151,964 filed on Feb. 3, 1988. In these proposals, no consideration is paid to introduction of a laser light into the waveguide at a high efficiency as well as a laser noise resulting from optical feedback upon introduction of the laser light. Further, no consideration is paid to a change in wavelength of the laser light associated with a change in state (from a write-in state to a read-out state or from the read-out state to the write-in state) and a corresponding instantaneous change in direction of a light passed through a light deflector element using a surface acoustic wave (SAW). Therefore, there is a problem that a light spot on an optical recording medium instantaneously deviates from a desired track or address upon change of the state.

SUMMARY OF THE INVENTION

An object of the present invention is to provide an optical pickup in which the efficiency of utilization of a laser light is high, a laser noise resulting from optical feedback upon introduction of the laser light into a waveguide is small, and a better imaging or focusing characteristic can be obtained.

Another object of the present invention is to provide an optical pickup in which a light spot on a recording medium can be maintained at a predetermined position even if the wavelength of a semiconductor laser changes upon change between a read-out state and a write-in state.

A further object of the present invention is to provide an optical pickup in which any chromatic aberration is not produced even if a multimode laser is used.

An optical pickup according to the present invention comprises at least a semiconductor laser, a waveguide optically coupled with the semiconductor laser for propagating therein a light from the semiconductor laser to guide it to a recording medium, and a light deflector element provided on the waveguide for deflecting the light propagated in the waveguide by means of a surface acoustic wave (SAW). A multi-mode oscillation semiconductor laser stably operates with longitudinal (or axial) modes the number of which is not larger than 5. Thereby, a laser noise resulting from an optical feedback upon introduction of the laser light into the waveguide can be suppressed. The semiconductor laser is disposed in proximity to the waveguide at a distance which is not larger than 1 $\mu$m. Thereby, the light from the semiconductor laser can be inputted into the waveguide with a high efficiency.

Also, in the optical pickup according to the present invention, a frequency applied to the light deflector element may be changed upon change between a read-out state and a write-in state, thereby holding a light spot on the recording medium at a predetermined position (i.e. a predetermined track or address). Namely, upon change from the write-in state to the read-out state or from the read-out state to the write-in state, the frequency f of the SAW is increased or decreased by $\Delta f$ which is defined by $$\Delta f = -f \times \Delta\lambda/\lambda, \qquad (1)$$

wherein $\Delta\lambda$ is a change in wavelength of the semiconductor laser associated with the change of the state.

Further, in the optical pickup according to the present invention, in the case where a grating is used as a light coupling element between the waveguide and the exterior thereof, a hologram grating is disposed in a laser light flux derived through the light coupling grating from the waveguide to the exterior thereof so that a chromatic aberration produced at the light coupling grating due to a change in wavelength of the semiconductor laser is cancelled by a chromatic aberration produced at the hologram grating. Namely, if a relation of $$\frac{\sin\alpha - \sin 90°}{\cos\alpha} = \frac{\sin\beta - \sin\gamma}{\cos\beta} \qquad (2)$$

is satisfied wherein $\alpha$ is the angle of emergence of the laser light derived or emerging from the waveguide through the light coupling grating, $\beta$ is the angle of incidence of the laser light upon the hologram grating and $\gamma$ is the angle of emergence of the laser light emerging from the hologram grating, there can be obtained a condition in which the angle $\gamma$ of emergence of the laser light from the hologram grating does not change even if the wavelength of the semiconductor laser changes.

DESCRIPTION OF THE PREFERRED EMBODIMENTS

Figure 1:
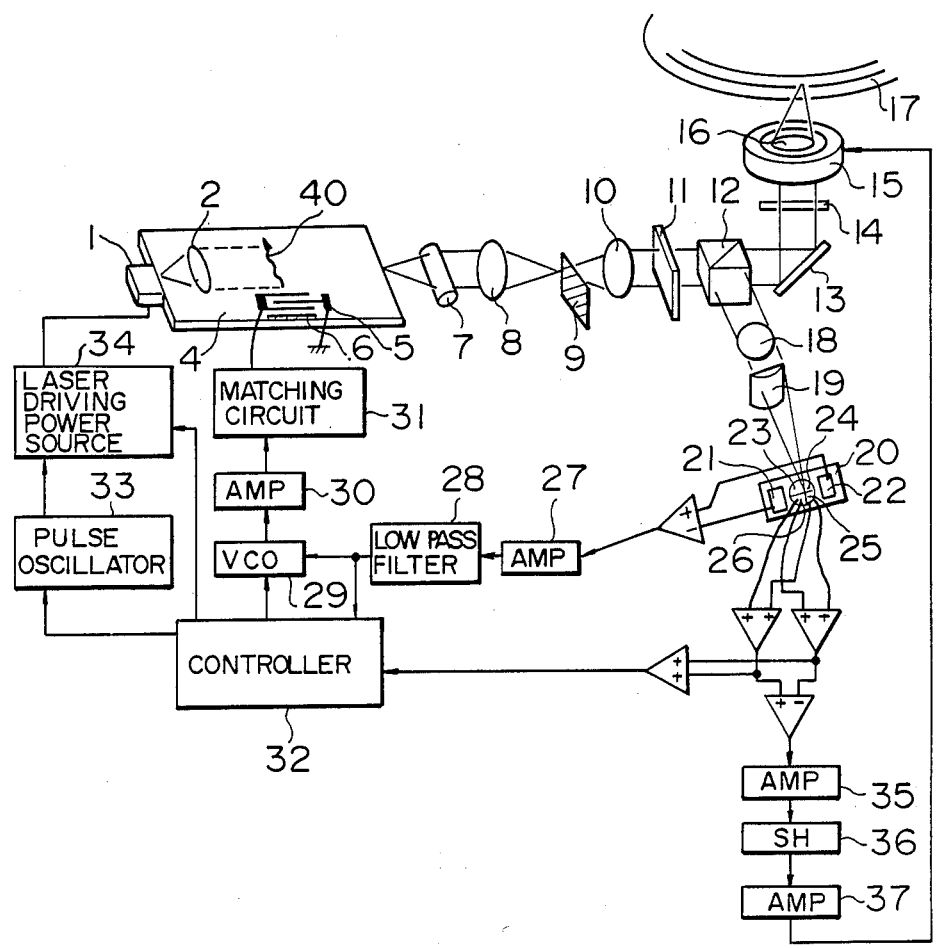
FIG. 1 is a view showing the construction of an example of an optical disk system using an optical pickup according to an embodiment of the present invention.

FIG. 1 shows an example of the construction of an optical disk system using an optical pickup according to the present invention. In the case where the reading of optical information is to be made, a signal is applied from a controller 32 to a laser driving power source 34 to cause a semiconductor laser 1 to continuously oscillate with a low output power. A light emitted from the semiconductor laser 1 is introduced into a waveguide 4, is collimated by a lens 2 formed in the waveguide 4 and is propagated in the waveguide 4. The waveguide 4 is made of, for example, Ti-LiNbO3 formed by thermally diffusing Ti into the surface of a LiNbO3 crystal. The reason why Ti-LiNbO3 is used as the waveguide 4, is that this crystal has a large elastic constant and hence a surface acoustic wave (SAW) is liable to be excited thereon. A comb-shaped electrode or SAW electrode 5 is disposed on a surface of the waveguide 4 for exciting on the surface of the waveguide 4 a surface acoustic (SAW) wave 40 which has the same frequency as that of an RF (radio frequency) signal applied to the comb-shaped electrode 5. The SAW acts on the light guided through the waveguide to deflect the direction of propagation of the guided light by virtue of an acousto-optic effect by an amount necessary for tracking or track jump. The deflected light emerges from an end face of the waveguide 4 and is converged or focused onto an optical disk 17 by an optical system. Any suitable optical system can be employed. In the shown embodiment, the light emerging from the end face of the waveguide 4 is converted into a collimated light by a cylindrical lens 7 and a 0-th order deflected component (i.e. a light component which has not been deflected by the SAW) is cut off by a knife edge 9 placed in a focal plane of a spherical lens 8. The light is collimated through a spherical lens 10 again and split to three directions by a grating 11. The light through the grating 11 is passed through a polarizing prism (or polarization beam splitter) 12 and reflected by a mirror 13. The reflected light passes through a quarter-wave plate 14 and is converged onto the optical disk 17 by an objective lens 16.

The light is converged in the form of three light spots onto the optical disk 17 by the action of the grating 11. The adjustment of a focal point of the objective lens 16 is effected by a voice coil 15.

The light reflected from the optical disk 17 passes through the objective lens 16 and the quarter-wave plate 14 is reflected by the mirror 14 and the polarizing prism 12. The reflected light is directed to a detection optical system. The detection optical system may comprise a lens 18 and a cylindrical lens 19 which is an astigmatism element. In the detection optical system, an astigmatism is produced in the reflected light derived by the polarizing prism 12. The light involving the astigmatism is received by a light detector 20. The light detector 20 includes four quarter parts 23, 24, 25 and 26 at a central portion thereof and two parts 21 and 22 at the left and right portions thereof. The outputs of the four parts 23 to 26 at the central portion of the light detector 20 are properly processed so that a part of the resulting data is sent as an information reproduction signal to the controller 32 while the other part thereof is sent as an auto-focus control signal to an amplifier 35. The principle of focus control is known by U.S. Pat. No. 4,293,944. A difference between the outputs of the left and right parts 21 and 22 is obtained by differential amplifier 214 and sent as a tracking signal to an amplifier 27.

The auto-focus control signal sent to the amplifier 35 is passed through a sample and hold circuit 36, is amplified by an amplifier 37 again, and is applied to the auto-focus driving device or voice coil 15. The sample and hold circuit 36 is provided for the purpose of holding the auto-focus control signal at a constant level when a light spot is greatly moved by the SAW. This technique is disclosed in detail by the above-mentioned U.S. Ser. No. 842,200.

The tracking signal sent to the amplifier 27 is supplied to a voltage controlled oscillator (VCO) 29 through a suitable low-pass filter 28 and thereafter applied to the comb-shaped electrode 5 through an amplifier 30 and a matching circuit 31. A light deflector element constructed by the comb-shaped electrode 5 may be driven by an access signal which causes a light spot to move from a certain track to another track. The low-pass filter 28 is provided in order to amplify a lower frequency component of the tracking signal necessary for tracking and to cut off a higher frequency component thereof, thereby facilitating a tracking control. The VCO 29 is a circuit which changes the frequency of the RF signal applied to the comb-shaped electrode 5 by the tracking signal to change the frequency of the SAW, thereby changing the direction of deflection of the light. The matching circuit 31 is provided for making an impedance matching between the comb-shaped electrode 5 and the VCO 29. The SAW 40 excited onto the surface of the waveguide 4 by the comb-shaped electrode 5 are excited in opposite directions perpendicular to the comb-shaped electrode 5, and a surface acoustic wave excited in one of those directions causes the deflection of light while a surface acoustic wave excited in the other direction is reflected by an end face of the waveguide and is absorbed by a sound absorber 6 so that the surface acoustic waves do not interfere with each other.

In the case where the writing of information is to be made, the semiconductor laser 1 is oscillated with a high output power in a pulsed manner in accordance with information to be recorded. For this purpose, a signal is supplied from the controller 32 to a pulse oscillator which in turn activates the laser driving power source 34. A path of light emitted from the semiconductor laser which light is sent to the optical disk 17 and then reaches the light detector 20, is the same as that explained in conjunction with the case of reading information. The auto-focus control and tracking control are also the same as those in the case where information is read.

Next, a relation of coupling between the semiconductor laser 1 and the waveguide 4 will be explained.

In order to input a laser light from the semiconductor laser 1 to the waveguide 4 with a high efficiency, the waveguide 4 is disposed in proximity to the semiconductor laser 1 at a distance which is not larger than 1 $\mu$m. The semiconductor laser 1 used is a multi-mode laser which operates with longitudinal oscillation modes, the number of which is 2 to 5. Such a limitation of the number of longitudinal modes of the laser 1 is made on the basis of a relation between a laser noise resulting from an optical feedback and a focused spot.

Figure 2:
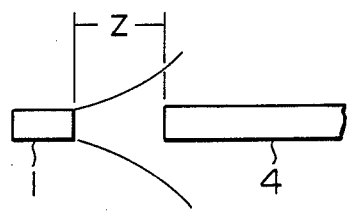
FIGS. 2 to 7 are views for explaining the operation of the optical disk system shown in FIG. 1, more particularly, FIG. 2 being a view for explaining a coupling relation between a semiconductor laser and a waveguide, FIG. 3 being a view for explaining the deflection of light by a surface acoustic wave (SAW), FIG. 4 being a view showing an example of the oscillation of a multi-mode oscillation semiconductor laser, FIG. 5 being a view showing the spread of a focused spot, FIG. 6 being a view showing the output powers of and the changes in wavelength of a semiconductor laser in read-out and write-in states, and FIG. 7 representing a characteristic curve showing a voltage applied to a VCO (voltage controlled oscillator) and the output frequency of the VCO.

The light emerging from the semiconductor laser 1 is a Gaussian beam having a diameter of about 1 $\mu$m $\times$ 2 $\mu$m at an end face of the laser 1 from which the light emerges. In order to input a TE wave into the waveguide 4, it is necessary to establish such a relation between the laser 1 and the waveguide 4 as shown in FIG. 2. Namely, the shorter beam diameter of 1 $\mu$m of the laser 1 corresponds to coincide with the direction of thickness of the waveguide 4 which has a thickness of about 1 $\mu$m. According to BSTJ (The Bell System Technical Journal), Vol. 45, (1966) pp. 287-299, the divergence of a laser beam, when the laser beam having the shorter diameter of 1 $\mu$m at the beam emergence face of the laser 1 is at a position distanced therefrom by Z, is given by $$\sqrt{1 + \left(\frac{4\lambda Z}{\pi}\right)^2} \tag{3}$$

If $\lambda$ (wavelength)=0.8 $\mu$m and Z=1 $\mu$m, the beam divergence is about 1.4 $\mu$m. Usually, the thickness of the waveguide 4 is about 1.0-2.5 $\mu$m. Therefore, if Z is selected to be not larger than 1 $\mu$m, the beam divergence can be made approximately equivalent to the thickness of the waveguide 4, thereby allowing the introduction of light to the waveguide with a high efficiency.

The reason why the number of oscillation modes of the semiconductor laser 1 is limited to a value not larger than 5, will now be explained in detail.

Figure 3:
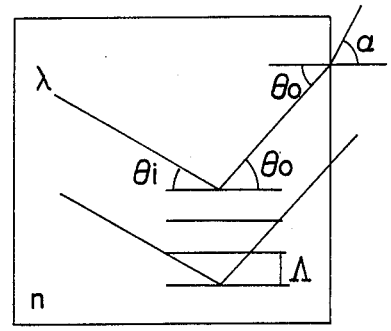

FIG. 3 shows a state of the deflection of light when an SAW is used. The angle $\theta_i$ of incidence and the angle $\theta_o$ of emergence satisfies the following relation based on the equation of diffraction:

$$n\Lambda(\sin \theta_i + \sin \theta_o) = \lambda. \tag{4}$$

Here, n is the index of refraction of the waveguide 4, $\lambda$ is the wavelength of the laser light in the air and $\Lambda$ is the wavelength of the SAW. In order to satisfy the Bragg condition and to make the efficiency of diffraction maximum, the angle $\theta_i$ of incidence is selected to satisfy a relation of $$2n\Lambda \sin \theta_i = \lambda \tag{5}$$

A change $\Delta\theta_o$ of the angle $\theta_o$ of emergence when the wave length $\lambda$ changes, is given from the differentiation of the equation (4), that is, $$n\Lambda \cos \theta_o \cdot \Delta\theta_o = \Delta\lambda \tag{6}$$

Since $\theta_o$ is usually smaller than 10° and hence if cos $\theta$ can be considered to be nearly equal to 1, the equation (6) can be rewritten as follows:

$$\Delta\theta_o = \frac{\Delta\lambda}{n\Lambda}. \tag{7}$$

Since this change $\Delta\theta_o$ of the angle $\theta_o$ of emergence takes place in a medium having the index of refraction of n, a change in angle when the light goes out into the air is as follows:

$$\Delta\alpha = \frac{\Delta\lambda}{\Lambda}. \tag{8}$$

This change $\Delta\alpha$ results in the amount $\Delta l$ of change of irradiation position of a light spot on the optical disk 17 which is given by $$\Delta l = f \cdot \Delta\alpha = f \cdot \frac{\Delta\lambda}{\Lambda} \tag{9}$$

wherein f is the focal length of the objective lense 16. For example, when the SAW of 200 MHz having an ultrasonic wave velocity of $3 \times 10^3$ m/s is used in the waveguide made of Ti-LiNbO$_3$, the wavelength $\Lambda$ of the SAW is given by $$\Lambda = 15 \ \mu\text{m}. \tag{10}$$

On the other hand, in the case where a so-called single-mode laser is used as the semiconductor laser, a mode hopping noise is generated due to the change of temperatures and/or the feedback of laser light to an oscillator. Therefore, a gain-guided multi-mode laser or a single-mode laser forced to oscillate in multiple modes through a high frequency current superposition method is used as the semiconductor laser 1. Namely, when the semiconductor laser 1 is disposed in proximity to the waveguide 4 at a distance in the order of 1 $\mu$m, the laser light can effectively enter the waveguide 4 but a laser noise must be taken into consideration since a lot of light is reflected at the inlet of the waveguide 4 and returns to the laser oscillator 1.

An interval between adjacent oscillation wavelengths in a multi-mode oscillation semiconductor laser is $$\Delta\lambda_i = \frac{\lambda^2}{2L} \tag{11}$$

wherein L is the length of the oscillator. Provided that $\lambda$ is 0.8 $\mu$m and L is 1 mm, $\Delta\theta_i$ is 0.32 nm. Accordingly, the amount of change of a light spot position resulting from the existence of two oscillation modes, when the focal length f of the objective lens 16 is 4.5 mm, is $$\Delta l = 4.5 \times \frac{3.2 \times 10^{-4}}{15} \text{ mm} \quad (12)$$

$$= \frac{4.5 \times 3.2 \times 10^{-1}}{15} \mu m$$

$$= 0.096 \ \mu m.$$

On the other hand, the diameter $\Phi$ of a focused spot on the optical disk 17, when the NA (numerical aperture) of the objective lens 16 is 0.5, is $$\phi = \frac{0.8}{0.5} \mu m = 1.6 \ \mu m. \quad (13)$$

Figure 4:
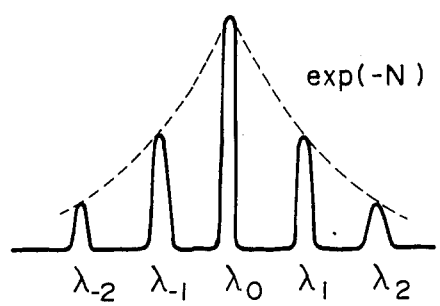

Therefore, it can be understood that the focused spot spreads by about 5% due to the existence of two oscillation modes. In the case where a laser having three longitudinal oscillation modes is used, the diameter of the focused spot would spread by about 10%. Even if the focused spot diameter has a spread amounting to about 10%, any practical problem does not arise in the case where information is recorded on or reproduced from an optical recording medium such as an optical disk. The number of oscillation modes up to 5 is acceptable. This is because the intensities of five oscillation modes have a distribution as shown in FIG. 4 or the intensity becomes weak with increased distance from the center wavelength and hence the existence of five oscillation modes makes no substantial difference from the case where about three modes are oscillated with equal intensities, as is shown by solid line 100 in FIG. 5.

A single shaped non-spherical converging lens can be used. A working distance between such a converging lens and the optical disk becomes long. Therefore, if the focal length of the lens can be made correspondingly small, $\Delta l$ becomes small, thereby reducing influence of the multi-mode oscillation.

Next, explanation will be made of a change in wavelength of the laser light caused by change between a read-out state and a write-in state and a deviation of the direction of deflection of light by the light deflector element resulting from the change of wavelength.

In the case where a semiconductor laser is used as a light source, an output power of the laser in the write-in state is made larger than that in the read-out state and hence the wavelength increases upon change to the write-in state ($\Delta\lambda \gtrsim 4$ nm). Since the angle of deflection of light by a surface acoustic wave element is proportional to the wavelength of the light, the direction of deflection of the light deviates and hence a light spot on the optical recording medium also deviates. The deviation $\Delta\theta$ of the direction $\theta$ of deflection of the light is $$\Delta\theta = \Delta\lambda/(n\Lambda \cdot \cos\theta) \quad (14)$$

wherein F is the wavelength of the light (in the vacuum), $\Lambda$ is the wavelength of the SAW (surface acoustic wave) and n is the index of refraction of the waveguide. The deviation $\Delta x$ of the light spot on the optical recording medium is $$\Delta x = F \times \Delta\theta \times \frac{n}{n_{air}} \quad (15)$$

wherein F is the focal length of a lens which converges light onto the optical recording medium. The deviation of the light spot occurs in a direction perpendicular to a track. In the case of $\Delta\lambda = +5 \ \mu m$, $\Lambda = 10 \ \mu m$, $\cos\theta \sim 1$ and F=4 mm, $\Delta x$ is $+2.0 \ \mu m$. Namely, in a moment a change from the read-out state to the write-in state is made, the light spot is moved in the direction of $\oplus$ by about 1.25 tracks. On the other hand, in a moment a change from the write-in state to the read-out state is made, the light spot is moved in the direction of $\ominus$ by about 1.25 tracks. Accordingly, there is a problem that if a tracking servo is applied, the light spot jumps from a certain track to a track adjacent thereto. Also, in the case where a semiconductor laser having a high output power is used, there is a fear the light spot jumps over several tracks since $\Delta\lambda$ and $\Delta x$ become still more larger. Therefore, in the present embodiment, the VCO 29 is controlled by the controller 32 upon change from the read-out state to the write-in state or upon change from the write-in state to the read-out state so that the frequency applied to the light deflector element is changed.

The angle of deflection of light by the light deflector element using a SAW is proportional to the frequency of the SAW. When the wavelength of a laser light propagated in the waveguide 4 is $\lambda+\Delta\lambda$, the change $\Delta\lambda$ of deflection angle upon change of the frequency SAW by $\Delta f$ is given by the following equation:

$$\Delta\theta = (\lambda+\Delta\lambda)\Delta f/n\Lambda \cdot \cos\theta. \quad (16)$$

By selecting $\Delta f$ in accordance with the equation (1), the equation (16) can be rewritten as follows:

$$\Delta\theta = -f \cdot \Delta\lambda/n\Lambda \cdot \cos. \quad (17)$$

In the equation (17), $\Delta\lambda << \lambda$ is assumed. The value of $\Delta\theta$ in the equation (17) cancels the deviation of deflection angle of the laser light represented by the equation (14) resulting from the change in wavelength of the laser light. Accordingly, if the frequency of the SAW is changed in accordance with the equation (1) when the wavelength of the laser light changes, it is possible to hold the light spot on the optical recording medium in a fixed track or address. This will be explained concretely herein below.

Figures 5, 6:
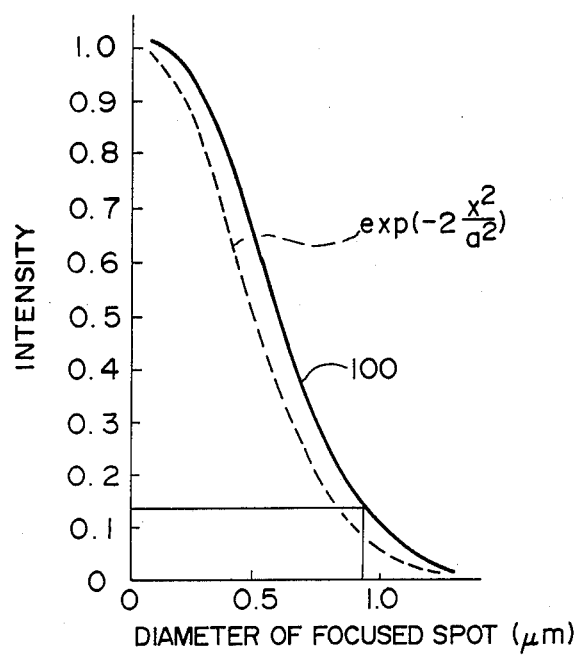
Figure 7:
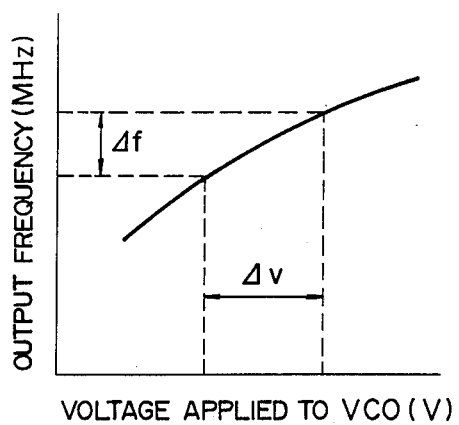

Upon change from a read-out mode to a write-in mode (or from the write-in mode to the read-out mode), a signal is supplied from the controller 32 to the pulse oscillator 33 to increase (or decrease) a laser driving current so that the output and wavelength of the laser light is increased (or decreased). An example of the power and the wavelength change in the read-out and write in states is shown in FIG. 6. At this time, a signal is sent from the controller 32 to the VCO 29 so as to decrease (or increase) the frequency of the SAW by the amount shown by the equation (1). For example, when the frequency f of the SAW immediately before the change of the state is 350 MHz and the wavelength $\lambda$ of the semiconductor laser is 0.8 $\mu m$, a voltage applied to the VCO 29 is changed so as to change the frequency of the SAW by $\Delta f = -2$ MHz (or $+2$ MHz). A relation between the voltage applied to the VCO 29 and the output frequency is shown in FIG. 7. When it is desired to change the frequency by $\Delta f$, the voltage applied to the VCO 29 is changed by $\Delta V$. In order to calculate $\Delta V$ by the controller 32, the characteristic shown in FIG. 7 and the wavelength change upon change of the state of the semiconductor laser are inputted to the controller 32. Further, a part of the tracking signal is taken into or fetched by the controller 32 in order to know the frequency of the SAW immediately before the state change. Based on these data, the controller 32 determines ΔV (voltage change) corresponding to the frequency change Δf of the equation (1) and applies it to the VCO 29 which in turn applies to the comb-shaped electrode 5 so that the frequency of the SAW is changed by Δf.

As a result, a light spot on the optical recording disk can be maintained in a fixed track upon change between the read-out state and the write-in state. Though a deviation of the light spot over one or several tracks may occur in the case where the frequency of the SAW is not changed upon change of the state, this deviation can be made zero in accordance with the present embodiment. Accordingly, any error in address can be eliminated, thereby improving the reliability of the system.

Also, since the track jump of the light spot is effected by the SAW, fast accessing is possible. A micro seek time in the case where the SAW is used can be reduced by one order as compared with the case where a galvano mirror is used, and hence an access time in the former case can be reduced by about 7 ms to 10 ms as compared with that in the latter case.

Figure 8:
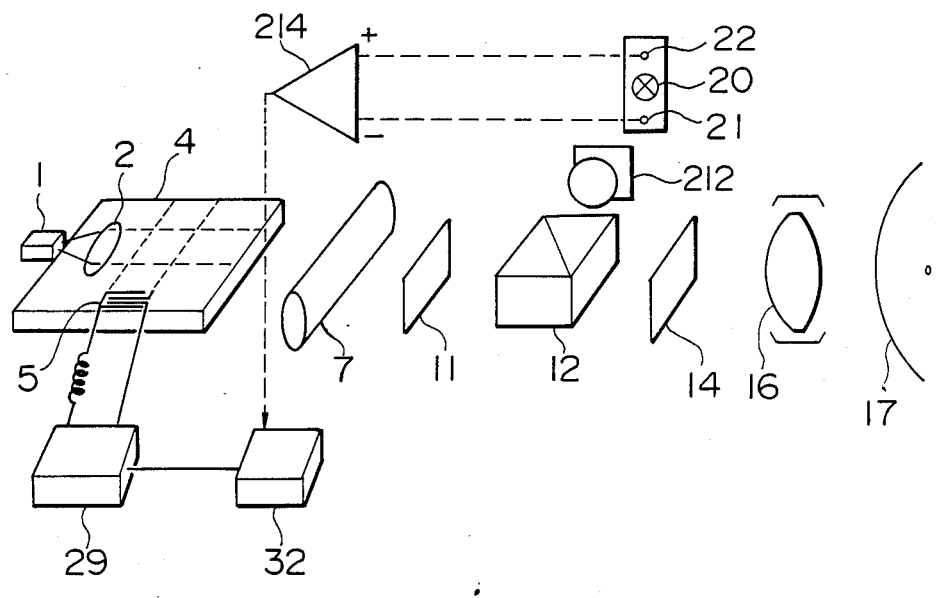
FIG. 8 is a view showing the construction of an optical pickup according to another embodiment of the present invention.

FIG. 8 shows another embodiment of an optical pickup according to the present invention. The present embodiment differs from the embodiment of FIG. 1 in that the optical system for converging the laser light emerging from the waveguide 4 is somewhat altered. A semiconductor laser drive system and an auto-focus control system, which may be the same as those shown in FIG. 1, are omitted from the illustration of FIG. 8.

Referring to FIG. 8, the 1st-order diffracted light emerging from the end face of the waveguide 4 is collimated by a cylindrical lens 7 and reaches the optical disk 17 through a grating 11 for tracking, a polarization beam splitter 12, a quarter-wave plate 14 and a converging lens 16. A single-shaped non-spherical lens can be preferably used as the converging lens 16, as has been mentioned above. The laser light reflected from the optical disk 17 follows a reverse path and reaches the polarization beam splitter 12. Since the laser light passes through the quarter-wave plate 14 twice, the polarization plane of the laser light is rotated by 90° so that the laser light is directed to a light detector 20. The light detector 20 is divided into six segments which include four segments at a central portion and two segments 21 and 22 at opposite side portions. The reflected lights from the optical disk 17 for the ±1st-order diffracted lights produced in the grating 11 are received by the two segmental detector elements 21 and 22 at the opposite side portions of the light detector 20. A detection system 212 for focus control is constructed by a spherical lens and a cylindrical lens and generates an astigmatism so that a focus control signal is detected by the four segmental detector elements at the central portion of the light detector 20. The structure of the light detector 20 is the same as that explained in conjunction with the embodiment shown in FIG. 1.

A SAW electrode 5 is connected with a voltage-to-frequency converter 29. Like the embodiment of FIG. 1, the SAW electrode 5 is controlled by a tracking signal and a frequency applied to the SAW electrode 5 is changed by the controller 32 upon change between the read-out state and the write-in state. The light deflector element constructed by the SAW electrode may be driven by an access signal which causes a light spot to move from a certain track to another track.

Figure 9:
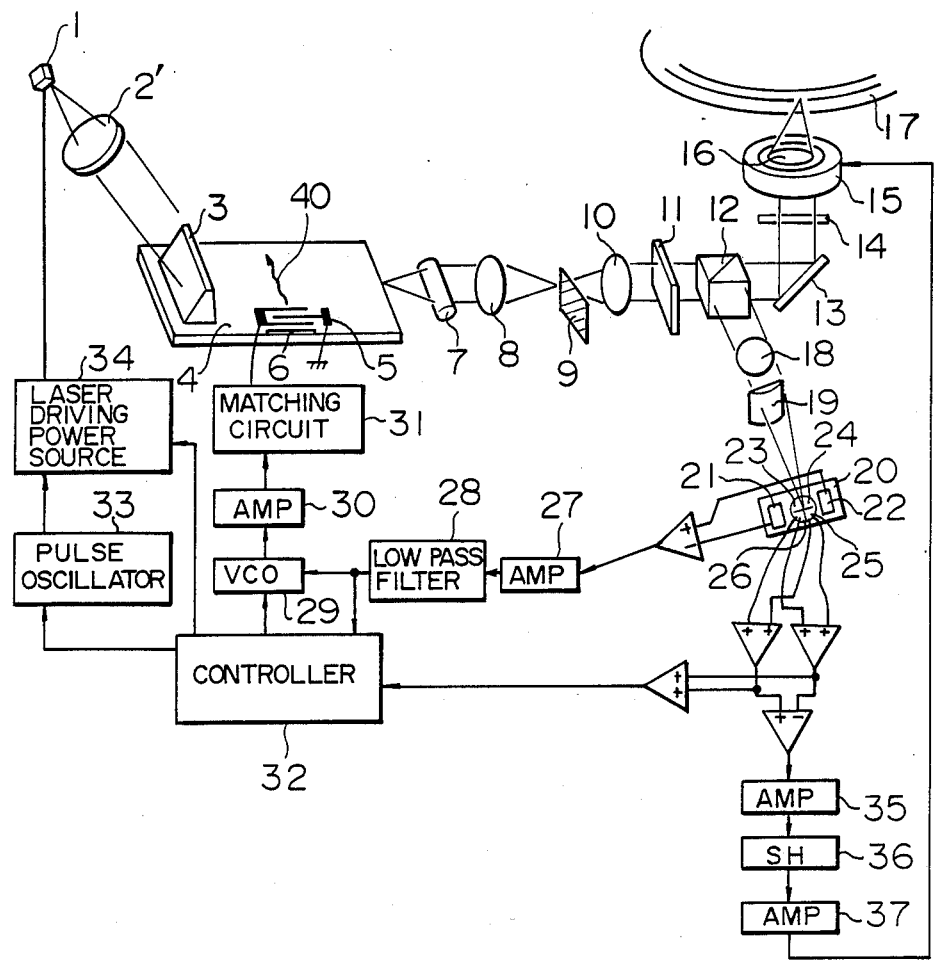
FIG. 9 is a view showing the construction of another example of an optical disk system using an optical pickup according to the present invention.

FIG. 9 shows another example of an optical disk system using an optical pickup according to the present invention. In the present embodiment, a laser light from the semiconductor laser 1 is introduced into the waveguide 4 through a prism 3. Namely, the laser light from the semiconductor laser 1 is collimated by a coupling lens 2' and inputted into the waveguide by the prism which is provided on the waveguide 4. The other construction is the same as that in the embodiment shown in FIG. 1 and hence any explanation thereof will be omitted.

Figure 10:
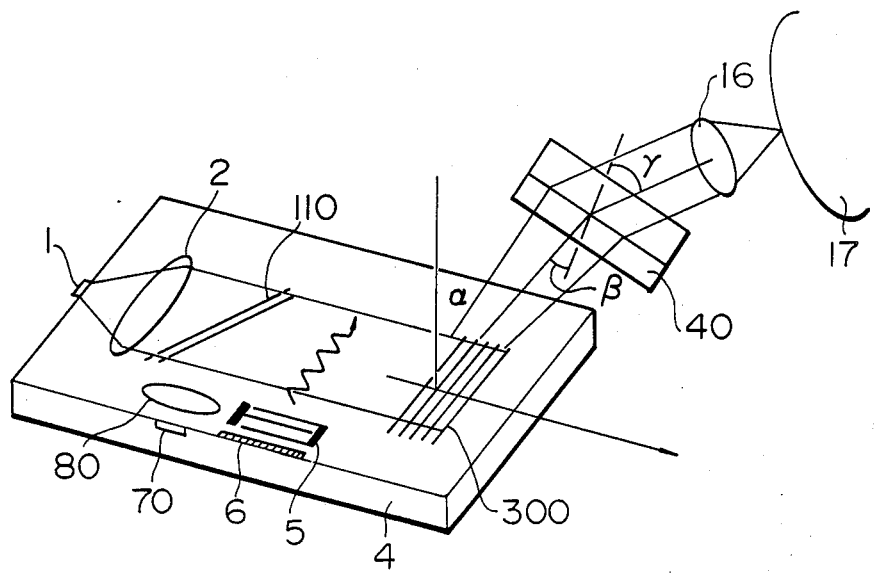
FIG. 10 is a view showing the construction of an optical pickup according to a further embodiment of the present invention.

In the foregoing embodiments, the laser light emerging from the end face of the waveguide has been converged onto the optical recording medium by the optical system. It is possible to provide a grating in the waveguide and to use this grating as a light coupling element between the waveguide and the exterior thereof. By using such a grating, an optical system including a beam splitter, lenses, etc. can be integrated on the waveguide, thereby providing a small-sized optical pickup. However, in the case where the grating is used as the light coupling element between the waveguide and the exterior thereof, there is a problem that a chromatic aberration may be produced when the oscillation wavelength of the semiconductor laser changes due to the change of temperatures, etc. or when a multi-mode semiconductor laser is used. FIG. 10 shows a further embodiment of an optical pickup according to the present invention. In the embodiment shown in FIG. 10, a laser light is derived from the waveguide 4 by a grating 300 formed in the waveguide 4, and a hologram grating 400 is provided in an optical path of the laser light so that a chromatic aberration produced by the grating 300 due to the change in wavelength of the semiconductor laser 1 is cancelled by a chromatic aberration produced by the hologram grating 400. A drive system for the SAW light deflector element 5, a drive system for the semiconductor laser 1, and tracking and auto-focus control systems may be the same as those in the embodiment of FIG. 1 and are therefore omitted from the illustration of FIG. 10.

A laser light from the semiconductor laser 1 is inputted to the waveguide 4 in which the laser light is collimated by the lens 2. The laser light propagated in the waveguide 4 passes through a half prism 110 formed in the waveguide 4 and enters the grating 300. Like the embodiment shown in FIG. 1, the laser light is deflected by a SAW from the light deflector element 5. The grating 300 is formed perpendicular to the optical axis and the pitch d of the grating 300 is selected to satisfy a relation of $$d(-\sin \alpha + \sin 90°) \qquad (18)$$

wherein λ is the center wavelength of the laser.

When a light having the wavelength of λ is inputted to the grating 300 in such a condition, the laser light from the grating 300 involves a diffracted light in a direction of α as shown in FIG. 10. The hologram grating 400 is disposed such that the diffracted laser light enters the hologram grating 400 in a direction of β and emerges therefrom in a direction of γ. In this case, if a relation of $$\frac{\sin\alpha - \sin 90°}{\cos\alpha} = \frac{\sin\beta - \sin\gamma}{\cos\beta} \qquad (2)$$

is established, $\gamma$ has no change even if the wavelength involves any change. The reason will be explained hereinbelow:

Now assume that the wavelength changes from $\lambda$ to $\lambda(1+\Delta m)$. Then, by making a differentiation of the equation (2), a change $\Delta\gamma$ of the angle of emergence of the laser light from the waveguide 4 is given by the following relation:

$$d \cdot \Delta\alpha \cdot \cos\alpha = \Delta m \cdot \lambda. \quad (19)$$

The equation (18) can be rewritten as follows:

$$d = \frac{\lambda}{-\sin\alpha + \sin 90°}. \quad (20)$$

By introducing the equation (19) into the equation (20), one obtains $$\Delta\alpha = \frac{m(-\sin\alpha + \sin 90°)}{\cos\alpha}. \quad (21)$$

The hologram 400 is one kind of grating and the pitch d' of interference fringes of the hologram grating 400 satisfies a relation of $$d'(-\sin\beta + \sin\gamma) = \lambda. \quad (22)$$

Now consider that a light shifted in angle from $\beta$ by $\Delta\alpha$ and having a wavelength of $\lambda(1+\Delta m)$ enters the hologram grating 400. Then, provided that the laser light emerges from the hologram grating 400 in a direction of $\gamma+\Delta\gamma$, the equation (22) gives $$d'\{-\sin(\beta+\Delta\alpha)+\sin(\gamma+\Delta\gamma)\} = \lambda(1+\Delta m). \quad (23)$$

By introducing the equation (22) into the equation (23), there is obtained the following relation:

$$\frac{\sin\beta + \Delta\alpha \cdot \cos\beta - \sin(\gamma + \Delta\gamma)}{\sin\beta - \sin\gamma} = 1 + \Delta m. \quad (24)$$

By introducing into the equation (24) a condition of $\Delta\gamma = 0$ that the angle $\gamma$ of emergence does not change, a relation of $$\frac{\Delta\alpha \cdot \cos\beta}{\sin\beta - \sin\gamma} = \Delta m \quad (25)$$

is obtained. By eliminating $\Delta\alpha$ and $\Delta m$ from the equations (25) and (21), one obtains $$\frac{\sin\alpha - 1}{\cos\alpha} = \frac{\sin\beta - \sin\gamma}{\cos\beta} \quad (26)$$

since $\sin 90°$ is 1. Namely, when the relation shown by the equation (26) is satisfied, the angle $\gamma$ of emergence of the laser light from the hologram grating 400 does not change even if the wavelength changes. Also, since a collimated light enters the grating 300 and the hologram grating 400, a light emerging from the hologram grating 400 and entering the converging lens 16, too, is a collimated light. Therefore, if a chromatic aberration of the lens 16 is corrected for the change of wavelength, any movement of an image point associated with the wavelength is eliminated throughout the optical pickup. If the optical disk 17 is positioned at a focus point of the lens 16, a light reflected from the optical disk 17 is introduced into the waveguide 4 through a reverse path and is separated from the light from the laser 1 by the half prism 110. The light from the half prism 110 is converged by a lens 80 and then received by a light detector 70. An output of the light detector 70 is properly processed to provide a tracking control signal, an auto-focus control signal and an information signal. Since such a signal processing is known and is not relevant to the essence of the present invention, any explanation of the signal processing will be omitted. However, one can refer to, for example, U.S. Ser. No. 842,200 which has been referred to in the present specification and discloses the combination of a folded grating and a linearly arranged quadrant light detector.

Figure 11:
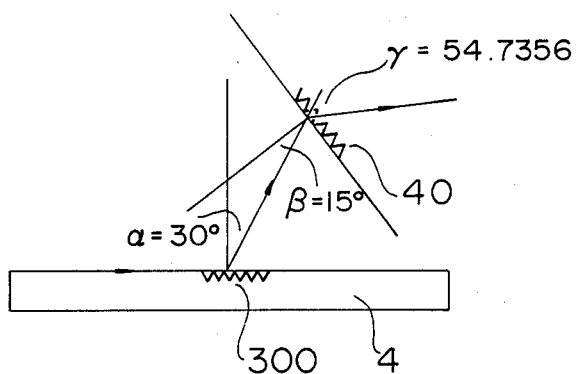
FIG. 11 is a view for explaining the operation of the embodiment shown in FIG. 10.

Next, the operation of the hologram grating 400 will be explained concretely by virtue of FIG. 11.

Now assume is $\alpha$ is 30° and $\beta$ is 15°. Then, the equation (2) is as follows:

$$\frac{+\frac{1}{2} - 1}{+\frac{\sqrt{3}}{2}} = \frac{\frac{\sqrt{6} - \sqrt{2}}{4} - \sin\gamma}{\frac{\sqrt{6} + \sqrt{2}}{4}}.$$

Accordingly, there results in $\sin\gamma = \sqrt{6}/3$ or $\gamma = 54.7356°$. Now consider a system in which $\lambda$ is 0.8 $\mu$m. Then, the pitch d of the grating 300 satisfying the equation (20) is $$d = \frac{0.8}{\frac{1}{2}} = 1.6 \ \mu m.$$

Provided that the wavelength changes from 0.8 $\mu$m to 0.805 $\mu$m, the accurate value of $\gamma\alpha$ is given by $$d\{\sin 90° - \sin(\alpha + \Delta\alpha)\} = 0.805 \ \mu m,$$

that is, $$\sin(\alpha + \Delta\alpha) = 1 - \frac{0.805}{1.6} = 0.496875$$

and hence $$\Delta\alpha = -0.206534°.$$

On the other hand, the pitch d' of interference fringes of the hologram grating 400 satisfying the equation (22) is $$d' = \frac{0.8}{\frac{\sqrt{6}}{3} - \frac{\sqrt{6} - \sqrt{2}}{4}} \ \mu m.$$

The change $\Delta\gamma$ of the angle $\gamma$ of emergence from the hologram grating 40 is given by $$d'\{\sin(15° - 0.206534°) - \sin(54.73° + \Delta\gamma) = 0.805 \ \mu m$$

and hence $$\Delta\gamma = -5.1 \times 10^{-3} \ (\text{degree}).$$

This value of $\Delta\gamma$ is very small or the angle $\gamma$ of emergence has no substantial change.

While a preferred embodiment has been set forth along with modifications and variations to show specific advantageous details of the present invention, further embodiments, modifications and variations are contemplated within the broader aspects of the present invention, all as set forth by the spirit and scope of the following claims.

We claim:

1. An optical pickup in which a light deflector element using a surface acoustic wave is provided in a waveguide, and a semiconductor laser capable of stably operating in longitudinal modes the number of which is not larger than 5 is disposed in proximity to said waveguide at a distance not larger than 1 μm.

2. An optical pickup comprising:
   a semiconductor laser which operates in longitudinal modes the number of which is not larger than 5;
   a waveguide disposed in proximity to said semiconductor laser at a distance not larger than 1 μm for propagating therein a light from said semiconductor laser and causing the propagated light to emerge therefrom toward a recording medium; and
   a light deflector element provided on said waveguide for deflecting the light propagated in said waveguide by means of a surface acoustic wave.

3. An optical pickup according to claim 2, further comprising frequency changing means for changing, a frequency applied to said light deflector element, by $\Delta f = -f \times \Delta\lambda/\lambda$ upon change between a read-out state and a write-in state, f being the frequency of the SAW immediately before the change of the state, λ being the wavelength of said semiconductor laser immediately before the change of the state and Δλ being a change in wavelength of said semiconductor laser associated with the change of the state.

4. An optical pickup according to claim 2, wherein said waveguide is made of Ti-LiNbO$_3$.

5. An optical pickup according to claim 2, wherein said light deflector element is driven by a tracking signal.

6. An optical pick up according to claim 5 wherein said tracking signal is applied to said light deflector element through a low-pass filter which cuts off a high frequency component.

7. An optical pickup according to claim 2, wherein said semiconductor laser operates with longitudinal oscillation modes the number of which is 2 to 5.

8. An optical pickup according to claim 2, wherein said semiconductor laser is a single mode laser which operates in only one longitudinal mode.

9. An optical pickup according to claim 2, wherein said semiconductor laser produces a Gaussian beam having a diameter of about 1 μm × 2 μm at an end face of the laser.

10. An optical pickup according to claim 2, wherein said semiconductor laser has a beam diameter shorter than a thickness of said waveguide.

11. An optical pickup, comprising:
    a semiconductor laser which operates in longitudinal modes the number of which is not larger than 5;
    a waveguide disposed in proximity to said semiconductor laser at a distance not larger than 1 μm for propagating therein a light from said semiconductor laser and causing the propagated light to emerge therefrom toward a recording medium; and
    a light deflector element provided on said waveguide for deflecting the light propagated in said waveguide by means of a surface acoustic wave,
    wherein the light propagated in said waveguide is derived from said waveguide by a grating provided in said waveguide, and a hologram grating is disposed in a path of the derived light so that a chromatic aberration produced by said grating provided in said waveguide and a chromatic aberration produced by said hologram grating are canceled from each other.

12. An optical pickup according to claim 11, wherein provided that the angle of emergence of a light emerging from said grating provided in said waveguide is α, the angle of incidence of the emerging light upon said hologram grating is β and the angle of emergence of a light emerging from said hologram grating is γ, a relation of $$\frac{\sin\alpha - 1}{\cos\alpha} = \frac{\sin\beta - \sin\gamma}{\cos\beta}$$

is satisfied.

13. An optical pickup comprising a waveguide for propagating therein a light from a light source to guide it to a recording medium and a light deflector element for deflecting the light propagated in said waveguide by means of a surface acoustic wave, in which a semiconductor laser is used as said light source, said semiconductor laser being operated in longitudinal modes the number of which is not larger than 5, and said semiconductor laser being disposed in proximity to said waveguide at a distance which is not larger than 1 μm.

14. An optical pickup according to claim 13, further comprising a voltage controlled oscillator for changing a frequency applied to said light deflector element so that a light spot on said recording medium is held at a predetermined position upon change between a read-out state and a write-in state.

15. An optical pickup according to claim 14, wherein a tracking signal is applied to said voltage controlled oscillator.

16. An optical pickup according to claim 15, wherein said tracking signal is applied to said voltage controlled oscillator through a low-pass filter which cuts off a high frequency component.

17. An optical pickup
    a semiconductor laser which operates in longitudinal modes the number of which is not larger than 5;
    a waveguide disposed in proximity to said semiconductor laser at a distance not larger than 1 μm for propagating therein a light from said semiconductor laser and causing the propagated light to emerge therefrom toward a recording medium; and
    a light deflector element provided on said waveguide for deflecting the light propagated in said waveguide by means of a surface acoustic wave,
    wherein the light propagated in said waveguide is derived from said waveguide by a grating provided in said waveguide, and a hologram grating is disposed in a path of the derived light so that a chromatic aberration produced by said grating provided in said waveguide and a chromatic aberration produced by said hologram grating are canceled from each other.

18. An optical pickup according to claim 17, wherein provided that the angle of emergence of a light emerging from said grating provided in said waveguide is α, the angle of incidence of the emerging light upon said hologram grating is β and the angle of emergence of a light emerging from said hologram grating is γ, a relation of $$\frac{\sin\alpha - 1}{\cos\alpha} = \frac{\sin\beta - \sin\gamma}{\cos\beta}$$

is satisfied.

19. An optical pickup comprising:
a semiconductor laser;
a waveguide optically coupled with said semiconductor laser for propagating therein a light from said semiconductor laser to guide it to a recording medium;
a light deflector element provided waveguide for deflecting the light propagated in said waveguide by means of a surface acoustic wave;
driving circuit for changing a drive current of said semiconductor laser between a read-out state and a write-in state; and
an oscillator for changing a frequency applied to said light deflector element so that a light spot on said recording medium is held at a predetermined position upon change between the read-out state and the write-in state.

20. An optical pickup according to claim 19, wherein a multi-mode laser capable of operating in longitudinal modes the number of which is not larger than 5 is used as said semiconductor laser, and said multi-mode laser is disposed in proximity to said waveguide at a distance which is not larger than 1 $\mu$m.

21. An optical pickup according to claim 19, wherein a tracking signal is applied to said oscillator.

22. An optical pickup according to claim 21, wherein said tracking signal is applied to said oscillator through a low-pass filter which cuts off a high frequency component.

23. An optical pickup according to claim 19, wherein said oscillator changes, the frequency applied to said light deflector element, by $\Delta f = -f \times \Delta\lambda/\lambda$ upon change of the state, f being the frequency of the surface acoustic wave immediately before the change of the state, $\lambda$ being the wavelength of said semiconductor laser immediately before the change of the state and $\Delta\lambda$ being a change in wavelength of said semiconductor laser associated with the change of the state.

24. An optical pickup in which a grating for deriving from an optical waveguide to the exterior thereof is provided on said optical waveguide, said grating is formed in a direction perpendicular to an optical axis, a collimated light is made incident upon said grating, and a hologram grating is provided which satisfies a relation of $$\frac{\sin\alpha - 1}{\cos\alpha} = \frac{\sin\beta - \sin\gamma}{\cos\beta}$$

wherein $\alpha$ is the angle of emergence of the collimated light emerging from said optical waveguide, $\beta$ is the angle of incidence of the emerging light upon said hologram grating and $\gamma$ is the angle of emergence of a light emerging from said hologram grating.

25. An optical pickup for reading and writing to tracks on an optical recording medium, comprising:
a semiconductor laser that changes wavelength with changes in driving current;
waveguide means optically coupled with said semiconductor laser for propagating therein a light from said semiconductor laser to guide it to a track on said recording medium;
light deflector element means provided on said waveguide for deflecting the light propagated in said waveguide by means of a surface acoustic wave that produces an amount of deflection proportional to the wave length of the light in response to being energized by a control signal, with the amount of deflection also being proportional to the change of the control signal;
tracking means for correcting relative movement between the light and a track on said recording medium by feedback of information related to the relative movement, by changing the control signal of said light deflector element means in response to the feedback and by producing a corresponding corrective relative movement in response to the changing of the control signal;
laser driving circuit means for changing a drive current of said semiconductor laser between a read-out state and a read-in state, with the change in drive current being sufficient to change the light wavelength and thus change the light deflection in an error relative movement between the light and track sufficient to move the light out of its track and produce an error; and
feed forward controller means responsive to said laser driving circuit means changing drive current between the read-out state and the read-in state, prior to any said error relative movement, for changing the control signal by an amount that would produce a corresponding relative movement between the light and track opposite to and substantially equal to said error relative movement, so that the relative movement effect of the change in drive current is canceled prior to actually producing relative movement between the light and track, so that a light spot on said recording medium is held in a predetermined position upon change between the read-out state and the read-in state.

26. The optical pickup according to claim 25, wherein said controller means includes a voltage controlled oscillator; and said laser driving circuit means changing the drive current in an amount that would produce a deflection of the light at the recording medium an amount greater than the distance between adjacent tracks of the recording medium.

27. The optical pickup according to claim 26, wherein said controller means determines the frequency of the surface acoustic wave, stores a relationship between the change in power between the read-out state and the read-in state versus change in wavelength of the light, and is responsive to said relationship and the determined frequency of the surface acoustic wave immediately before the state change to produce said control signal.

28. The optical pickup according to claim 25, wherein said controller means determines the frequency of the surface acoustic wave, stores a relationship between the change in power between the read-out state and the read-in state versus change in wavelength of the light, and is responsive to said relationship and the determined frequency of the surface acoustic wave immediately before the state change to produce said control signal.

29. An optical pickup, comprising:
a multi-longitudinal mode semiconductor laser that produces light with longitudinal modes in number within the range of 2 to 5 in a Gaussian beam having a height of about 1 micrometer and a width of about 2 micrometers at an end face of the laser from which the light emerges;

a waveguide disposed in proximity to said semiconductor laser and having a light entrance face immediately adjacent said semiconductor laser end face, with a spacing therebetween not larger than 1 micrometer for propagating therein the light from the semiconductor laser and causing the propagated light to emerge therefrom toward a recording medium, and the thickness of said waveguide being about 1 micrometer and aligned with the thickness of said light Gaussian beam at the end face of the semiconductor laser; and light deflector element means provided on said waveguide for deflecting the light propagated in said waveguide by means of a surface acoustic wave.

30. A tracking method for optical pickup having a semiconductor laser, a waveguide optically coupled with said semiconductor laser for propagating therein a laser beam from said semiconductor laser to guide it to a recording medium, a light deflector element provided on said waveguide for deflecting the beam by means of a surface acoustic wave, a laser driving circuit for changing a drive current of said semiconductor laser and an oscillator for changing a frequency of a control signal applied to said light deflector element, said method comprising the steps of:

supplying the driving current to the semiconductor laser;

changing the frequency of the control signal to position the laser beam on a desired track;

changing the driving current to change between a read-out mode and write-in mode;

changing the frequency of the control signal a predetermined amount in accordance with the change between read-out mode and write-in mode.

* * * * *